April 9, 1929.  A. W. HAISS  1,708,132
LOADER
Filed March 31, 1927  2 Sheets-Sheet 1
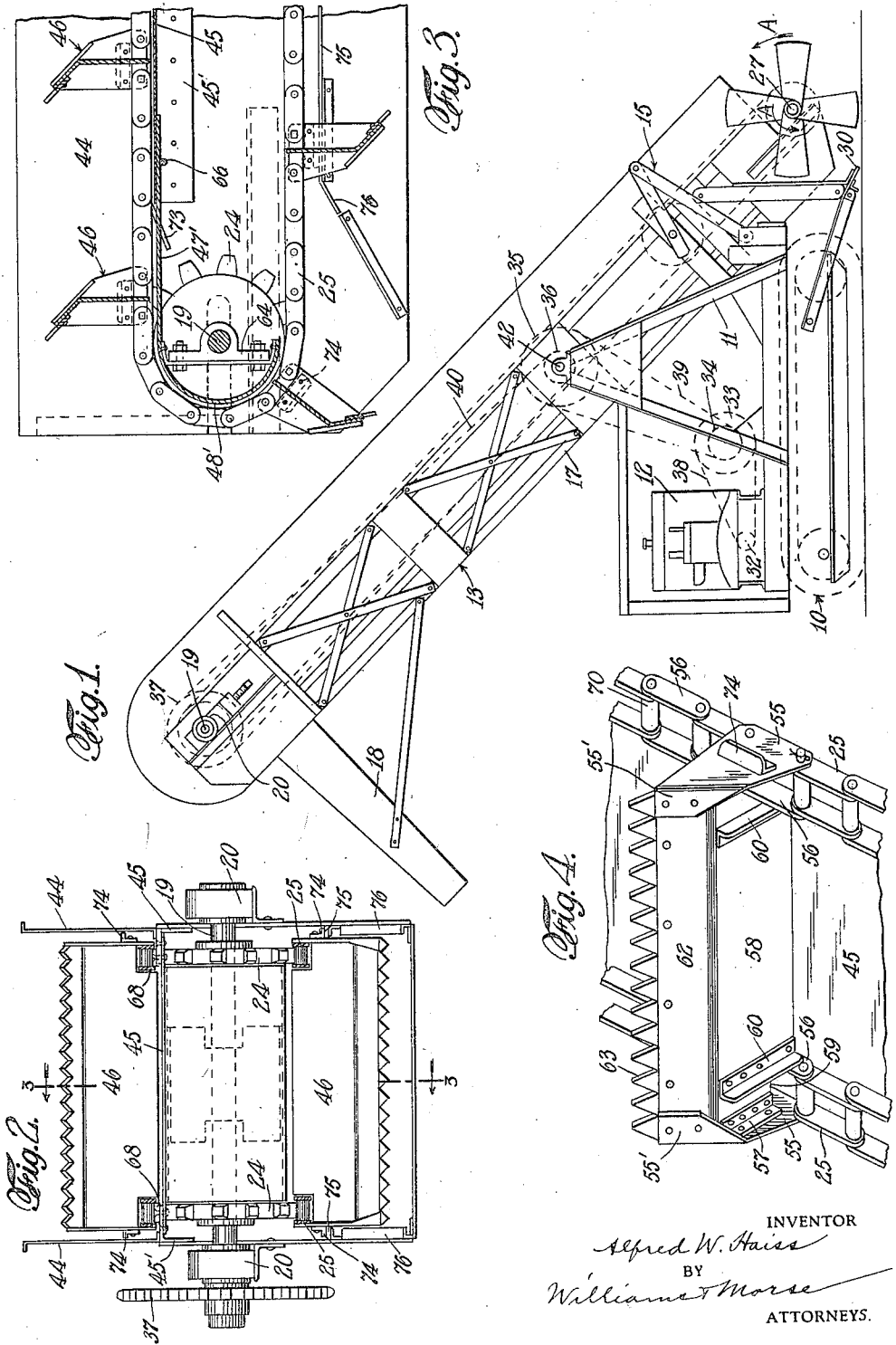

April 9, 1929.   A. W. HAISS   1,708,132
LOADER
Filed March 31, 1927   2 Sheets-Sheet 2
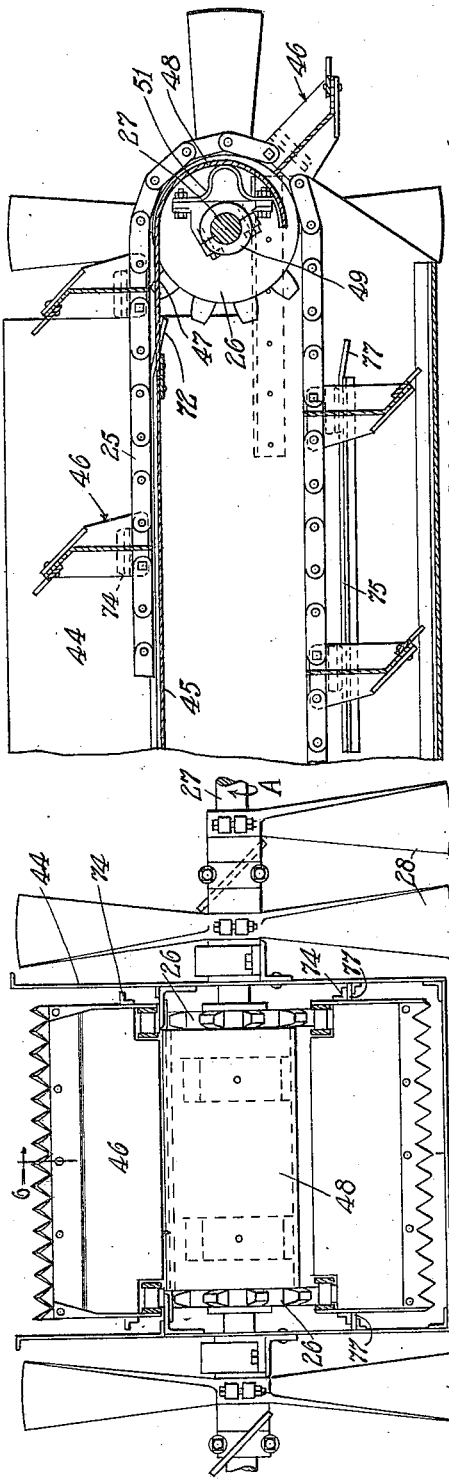
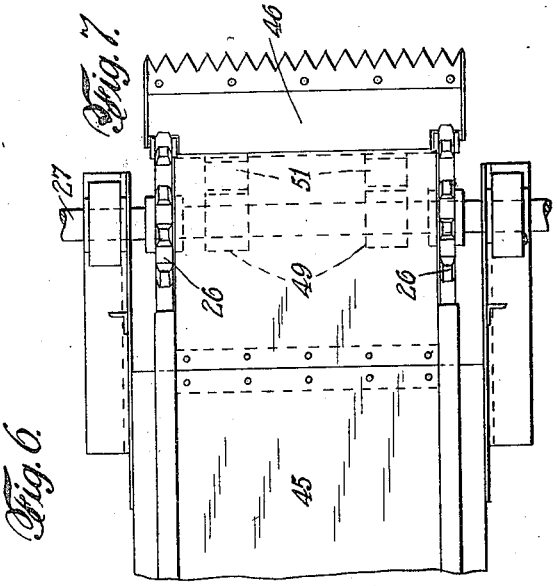
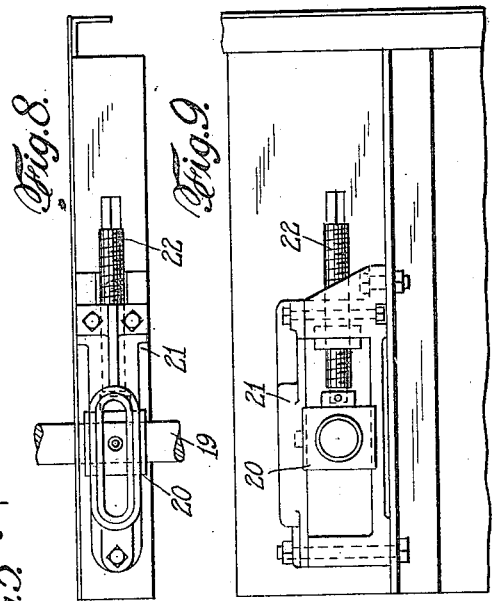
INVENTOR
Alfred W. Haiss
BY
Williams + Morse
ATTORNEYS.

Patented Apr. 9, 1929.

1,708,132

UNITED STATES PATENT OFFICE.

ALFRED W. HAISS, OF NEW YORK, N. Y., ASSIGNOR TO GEORGE HAISS MANUFACTURING CO., INC., OF NEW YORK, N. Y., A CORPORATION OF NEW YORK.

LOADER.

Application filed March 31, 1927. Serial No. 179,756.

This invention relates to loaders of the general type shown in United States Reissue Patent No. 15,515, granted to George Haiss January 2, 1923, wherein a plurality of feeding propellers are employed at the pick-up end of an endless conveyor to move the material operated upon into the path of the conveyor buckets as the loader is propelled or moved slowly into the material to be loaded.

An object of this invention is to provide certain improvements in a loader of the general type shown in the above mentioned patent, whereby such loaders are rendered particularly adapted for use in the handling of snow in an expeditious and otherwise satisfactory manner, although it will be understood that the loader embodying this invention is in no way limited for use in the handling of snow.

Other objects and advantages of the invention will become apparent from the following description when taken in connection with the accompanying drawings in which—

Figure 1 is a side elevation of a loader embodying this invention; Figure 2 is an end view of the upper or delivery end of a conveyor, the sprockets being shown in peripheral elevation and the sprocket chains being shown in section; Figure 3 is a central, vertical section taken on the line 3—3 of Figure 2; Figure 4 is a perspective view, showing a conveyor bucket or shoe and its relation to the cooperative apron or support over which the snow or other material is moved upward toward the discharge end of the conveyor; Figure 5 is an end view of the lower or pick-up end of the conveyor, the sprockets being shown in peripheral elevation and the sprocket chains in section, and the transverse shaft upon which the propellers or digging elements are carried being broken away at opposite ends; Figure 6 is a central, vertical section taken on the line 6—6 of Figure 5; Figure 7 is a plan view of the lower or pick-up end of the conveyor; Figure 8 is a detail plan view of an adjustable bearing for the transverse shaft carrying the sprockets at the discharge end of the conveyor; and Figure 9 is a side elevation of the bearing shown in Figure 8.

Referring to the drawings, the numeral 10 indicates a traction mechanism of the endless track type, upon which is mounted a frame 11 and a power unit 12. The frame 11 pivotally supports at its upper end a conveyor 13, which is adapted to be moved from its inclined operative position, shown in Figure 1, to a horizontal position by suitable raising and lowering mechanism indicated generally by the numeral 15, the horizontal position of the conveyor 13 being desirable when the loader is shipped or otherwise transported from place to place as a unit.

The conveyor 13 includes a suitable frame 17 and may be provided at its discharge end with a chute 18 to receive the elevated material and direct it into a wagon or other conveyance. The conveyor frame 17 carries at its upper end a transverse shaft 19, which is journaled in a pair of adjustable bearings 20, suitably mounted in bearing supports or guides 21, which are anchored to the frame 17, by any suitable means, and are provided with adjustable screw-threaded thrust shafts 22, to the square ends of which a suitable tool, such as a wrench, may be applied for the purpose of effecting the desired adjustment of the bearings 20 and a corresponding adjustment of the transverse shaft 19. The shaft 19 is provided with a pair of sprockets 24 over which pass sprocket chains 25, the sprocket chains in turn being carried by sprockets 26 suitably secured to a transverse shaft 27, journaled in the lower end of the frame 17 and projecting from each side thereof. The projecting ends of the shaft 27 are provided with a plurality of propellers or digging elements 28 arranged in two groups, one group of said digging elements being arranged at one side of the conveyor and the other group at the opposite side thereof. The blades of these propellers or digging elements 28 are so arranged in one group that their faces are oppositely inclined to the faces of the other blades, whereby the material to be loaded is moved inwardly from the sides of the conveyor and into the path of such conveyor as the shaft 27 is rotated in the direction of the arrows A shown in Figures 1 and 5. Preferably the propellers or digging elements 28 are so dimensioned that their outer ends overlap to a substantial degree, as shown in Figure 5, in order to insure a substantially clean sweeping action of the propellers or digging elements 28 as the loader is slowly propelled into the pile or other mass of material to be loaded, such slow or crowding movement of the loader being accomplished by suitable gearing, not shown, which may be interposed between the traction mechanism 10 and the power plant 12 and so constructed as to establish and sever driving connection between the traction mechanism 10 and power plant 12 at will. In order to collect any material not directly acted upon by the propellers or digging elements 28, a suitable clean-up scraper 30 is provided of the type shown, described and claimed in the copending application of Raymond C. Haiss, Serial No. 145,142 filed October 30, 1926, Patent No. 1,674,329, issued June 19, 1928. This scraper 30 extends in rear of the propellers or digging elements 28 and across the full width of the path to be cleared by the action of the loader. When the outer ends of the propellers or digging elements are adjusted so as to be substantially clear of the pavement or other surface over which the loader is operating, this scraper, being located so as to just clear the pavement, will collect any material not directly acted upon by the propellers or digging elements in rear thereof and by its extension in rear of the buckets or shoes it also collects any material not picked up by these buckets or shoes.

The power plant 12 which, as above explained, is adapted to slowly move the loader towards and into the pile or other mass of material to be loaded, is also adapted to propel the loader from place to place through suitable gearing not shown, which may be so constructed as to establish and sever driving connection between the traction mechanism 10 and the power plant 12 at will.

A further function of the power plant 12 is to drive the conveyor 13 which includes shafts 19 and 27, sprockets 24 and 26, and sprocket chains 25, the connection of the power plant 12 with the conveyor 13 being made through suitable clutch controlled gearing such as sprockets 32, 33, 34, 35, 36 and 37 and sprocket chains 38, 39 and 40, the sprockets 35 and 36 being carried by a transverse shaft 42 mounted upon the frame 11 and serving as an axis about which the conveyor is adapted to swing when raised and lowered by the raising and lowering mechanism 15, and the sprocket 37 being carried by the projecting end of the shaft 19 at one side of the delivery end of the conveyor.

Between the upper margins of the side walls 44 of the conveyor 13, a suitable apron or support 45 is arranged, such apron being suitably attached to the inner faces of the side walls 44 by angle irons 45' as shown in Figures 2 and 3, and serving to support the material as it is moved along between the side walls 44 toward the delivery end of the conveyor by conveyor buckets or shoes 46 carried by the conveyor chains 25 and hereinafter more particularly described. The apron or support 45 terminates at the lower or pick-up end of the conveyor, as shown in Figure 6, and is there suitably connected to an auxiliary support or apron 47 which terminates in a curved portion 48 partially encircling the shaft 27 in a spaced relation thereto. The curved portion 48 of the auxiliary apron 47 is suitably supported in a fixed relation to the axis of the shaft 27 by spaced journals 49 mounted upon the shaft 27 intermediate the sprockets 26, the journals 49 being provided with U-shaped straps 51, or the like, to which the curved portion 48 may be riveted, as shown most clearly in Figure 6. By providing the auxiliary apron or support 47 with a curved portion 48, the material, as it is scooped up or collected by the buckets or shoes 46, is supported within the buckets as they move progressively about the axis of the shaft 27, and this supporting is continued along the straight upper portion of the auxiliary support or apron 47 as the material moves along this support and continues to the apron or support 45, over which it is then moved upward to the delivery end of the conveyor 13.

Each bucket or shoe 46 includes a pair of end members 55 which may be substituted for certain link members 56 of the chains 25. The end members 55 are connected to a body plate 58 by suitable means, such as angle irons 57, the body plate being cut away or notched, as shown at 59, in order to receive the link members 56 opposite the end members 55, respectively. In order to stiffen or reinforce that portion of each body plate 58 which extends or projects into the space afforded between the chains 25, angle irons 60 may be attached to the rear faces of such plates, as shown most clearly in Figure 4. Each of the body plates 58 is bent at an angle as shown in Figures 3, 4 and 6, thereby providing an inclined scooping margin 62 which is adapted to be suitably connected to inwardly turned wings 55' formed integral with the end members 55. The scooping margins 62 may be provided with detachable and toothed cutting members 63, which are adapted to so function as to permit the buckets or shoes 46 to enter and pass through the material being loaded with the least amount of resistance.

The upper or delivery end of the conveyor 31 is also provided with an auxiliary apron or support 47' having a curved portion 48' partially encircling the shaft 19, the curved portion 48' being supported at a fixed distance from the shaft 19 by a bearing 64 carried by said shaft and suitably connected to the curved portion 48'. In order to permit adjustment of the shaft 19, whereby any undue slack in the chains 25 may be taken up, the auxiliary apron or support 47' is so mounted with respect to the support or apron 45 as to move relatively thereto, such relative movement being permitted in the present instance by reason of the fact that the rear end of the auxiliary support or apron 47' is movably supported upon a transverse rod 66 which is carried by the side walls 44 and spaced a sufficient distance from the apron 45 to accommodate thereunder the rear end of the auxiliary apron 47'.

Inasmuch as the combined weight of the chains 25 and buckets or shoes 46 may be considerable in a machine of the order herein shown, means may be provided for supporting such weight, and the means herein shown include the angle irons 45' and a pair of track members or wear strips 68 carried by the angle irons 45' and extending substantially from one end of the conveyor 31 to the other end thereof. These wear strips may be of a width sufficient to permit their being received between the link members 56 of the chains 25, whereby the rollers 70 of the chains 25 will engage the same and ride therealong in such a manner as to offer minimum resistance and wear between the wear strips 68 and chains 25. By providing such means for supporting the upper reaches of the chains 25 together with buckets or shoes 46 carried thereon, the bottom edges of the body plates 58 of the buckets or shoes 46 are maintained at a proper distance from the support or apron 45, to wit, just out of contact with the latter. If desired, the lower ends of the wear strip 68 may be bent downward as shown at 72 in Figure 6 in order that the chain rollers 70 may ascend the wear strips at an easy angle as they pass over and leave the sprockets 26. In order that these chain rollers 70 may likewise disengage the wear strips 68 at the upper or discharge end of the conveyor 31, such wear strips may be inclined downwardly as shown at 73 in Figure 3.

On the downward travel of the buckets or shoes 46, the weight of such buckets and the respective lower stretches of the chains 25 may be supported by means of outwardly projecting ears 74 carried by the end members 55 of the buckets 46, such ears being adapted to travel along on track members 75 carried by the side walls 44 of the conveyor 31 and extending from one end of the conveyor to the other end thereof. If desired, the track members 75 may be turned down at their receiving and discharge ends 76 and 77, shown respectively in Figures 3 and 6, in order that the wings 74 carried by the buckets 46 may be gradually lifted to and released from the track members 75.

What is claimed is:

A loader adapted to elevate material from a mass into a vehicle and including a conveyor frame, a pair of roller chains adapted to operate longitudinally of said frame and having upper and lower reaches respectively, side walls for said frame projecting above the upper reaches of said chains, an apron extending between said walls and adapted to support the material while being elevated, a track member located below the upper reach of each chain and adapted to engage the rollers thereof and maintain said reaches in parallel spaced relation, a plurality of collecting and delivering units having end walls connected in said chains and serving as links thereof, and each having a body plate supported out of contact with said apron by said track members, track members carried by said conveyor frame below the lower reaches of the respective chains, ears carried by the end walls of said units and adapted to engage the latter named track members and support the lower reaches of the respective chains, and means for operating said chains.

In testimony whereof, I have affixed my signature to this specification.

ALFRED W. HAISS.